United States Patent [19]

Pflederer

[11] 4,391,301
[45] Jul. 5, 1983

[54] HOLE REINFORCEMENT
[75] Inventor: Fred R. Pflederer, Wauwatosa, Wis.
[73] Assignee: A. O. Smith Corporation, Milwaukee, Wis.
[21] Appl. No.: 296,809
[22] Filed: Aug. 27, 1981
[51] Int. Cl.³ .................. B65D 90/02; F16L 9/16
[52] U.S. Cl. ........................... 138/103; 138/172; 138/DIG. 2; 220/72; 220/414
[58] Field of Search ............ 138/92, 97, 98, 99, 138/109, 158, 172, DIG. 2; 220/71, 72, 414

[56] References Cited
U.S. PATENT DOCUMENTS

| 1,527,300 | 2/1925 | Haerther | 138/109 X |
| 3,106,940 | 10/1963 | Young | 138/125 |
| 3,228,549 | 1/1966 | Courtney | 220/71 X |
| 3,303,079 | 2/1967 | Carter | 220/414 X |
| 3,315,989 | 4/1967 | Ohnstad | 138/99 X |
| 3,321,924 | 5/1967 | Liddell | 138/97 X |
| 3,393,821 | 7/1968 | Verlinden | 220/71 X |
| 3,432,188 | 3/1969 | Turner | 138/99 X |
| 4,202,379 | 5/1980 | Vetter | 138/97 X |

FOREIGN PATENT DOCUMENTS 624433  7/1961  Canada .................................. 138/92

Primary Examiner—Stephen Marcus
Assistant Examiner—Mark John Thronson
Attorney, Agent, or Firm—Andrus, Sceales, Starke & Sawall

[57] ABSTRACT

A filament wound structural vessel includes a cylindrical wall formed of a cured thermosetting resin reinforced by fibrous material. An opening in the wall is reinforced by a series of reinforcement bands formed by filament windings that encircle the wall and run adjacent the opening.

2 Claims, 3 Drawing Figures

HOLE REINFORCEMENT

BACKGROUND OF THE INVENTION

This invention relates to a filament wound tubular member and more particularly to a reinforcement for an opening in the wall of a filament wound vessel.

Filament wound vessels are generally fabricated by winding a resin impregnated fibrous strand around a mandrel in a generally helical pattern in a number of superimposed layers. In some cases, the strand is wound over rounded or curved ends on the mandrel to form the heads of the vessel integral with the cylindrical wall or shell. In other cases, the heads are formed separately and are secured by an adhesive within the open ends of the helically wound cylindrical shell.

Openings are normally provided in the shell or heads for fittings used for the introduction and removal of fluids or for the insertion of instruments or nozzles. The openings are normally made by cutting out the structural filamentary material after the vessel has been fabricated and cured. Since the stress resulting from internal pressure results in tension loads in the fibrous material of which the shell or wall of the vessel is composed, the holes cut in the wall will sever the load carrying filaments so that suitable means must be provided for transmitting the tension loads around the cut openings. Without means for transmitting the tension loads around the openings, the wall of the vessel would be greatly weakened in the area surrounding the opening.

In the past, fibrous patches bonded with a thermosetting resin have been applied to a vessel wall surrounding the openings therein as described in U.S. Pat. No. 3,106,940. According to this patent, one or more circumferentially wound annular patches are positioned in alignment with the location of the opening to be formed in the vessel wall and additional layers of the fibrous material are then wound or laid up over the patch. In the final cured vessel, the patch is embedded within the wall of the vessel, and the opening is then cut through the patched area.

Other methods included adhering a series of reinforcement patches around the opening after the opening had been cut through the wall.

SUMMARY OF THE INVENTION

An opening in the cylindrical wall of a filament wound vessel is reinforced by a series of reinforcement bands formed by filament windings that encircle the tank and run adjacent the opening.

The reinforcement bands may be applied using the same filament winding techniques that were employed during the formation of the vessel. Thus, the opening may be cut in the wall of the vessel and the reinforcing bands applied without removing the vessel from the winding mandrel.

The present invention provides a simple and inexpensive reinforcement structure for an opening in the wall of a cylindrical filament wound vessel. The reinforcement bands formed in the manner of the invention provides substantial reinforcement for the opening to transmit tension loads around the cut opening and prevent areas of weakness in the vessel wall.

BRIEF DESCRIPTION OF THE DRAWINGS

The drawings illustrate the best mode presently contemplated of carrying out the invention.

In the drawing.

DESCRIPTION OF THE PREFERRED EMBODIMENT

The drawings illustrate a cylindrical wall 1 of a vessel or tank adapated to contain a material under pressure. The wall 1 is provided with an opening 2, and a series of reinforcement bands 3 encircle the tank and are bonded to the wall.

The wall 1 is formed of fibrous material impregnated with a thermosetting resin. The fibrous material can take the form of mineral fibers, such as glass or asbestos; synthetic fibers, such as nylon, Dacron, Orlon or rayon; vegetable fibers, such as cotton; animal fibers such as wool, or metal fibers such as steel. The fibrous material is preferably wound onto a cylindrical mandrel in the form of a strand or web composed of substantially continuous, unidirectional fibers. However, in some cases, braided tubing, woven fabric or randomly arranged fibers, such as matting, can be employed to fabricate the cylindrical wall.

In most applications, the fibrous strand is wound in a generally helical pattern in a number of superimposed layers to form the wall 1. By using a mandrel having rounded or curved ends, the heads of the tank can be formed integrally with the cylindrical wall of the tank. In other situations, the heads may be formed separately, either of metal of fiber reinforced resin, and bonded within the opened ends of the cylindrical wall by a suitable adhesive.

The resin employed to impregnate the fibrous material of wall 1 can be any conventional thermosetting resin, such as epoxy resins, polyester resins, alkyd resins, ureaformaldehyde resins, melamine-formaldehyde resins, and the like. The resin can be applied to the fibrous material in any suitable manner, such as spraying, dipping, brushing, doctoring or the like, and the resin can be either in the liquid uncured state or a partially cured state when the strand is wound to form the cylindrical wall.

Figure 1:
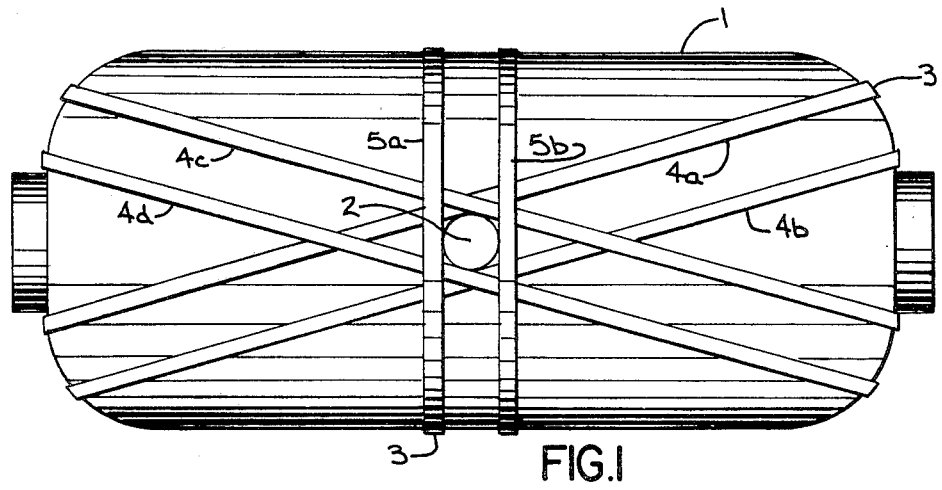
FIG. 1 is a side view of a filament wound vessel incorporating the present invention.
Figure 2:
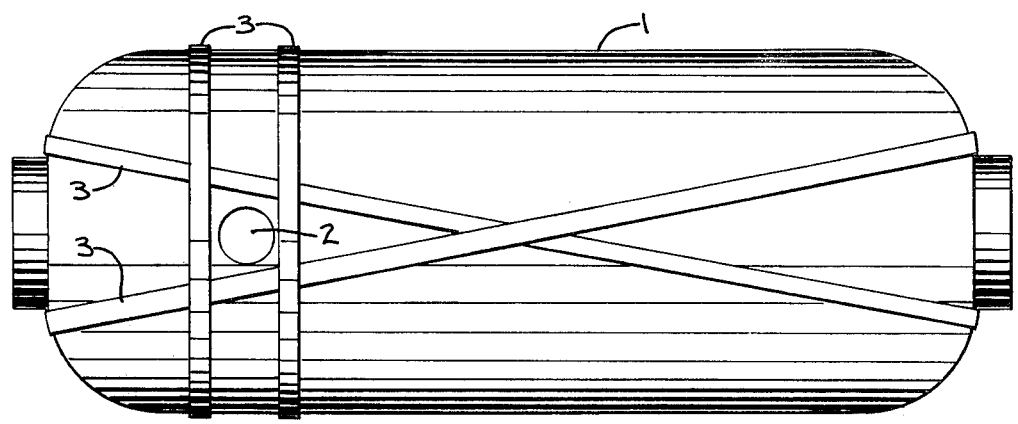
FIG. 2 is a side view of an alternate embodiment of the present invention.
Figure 3:
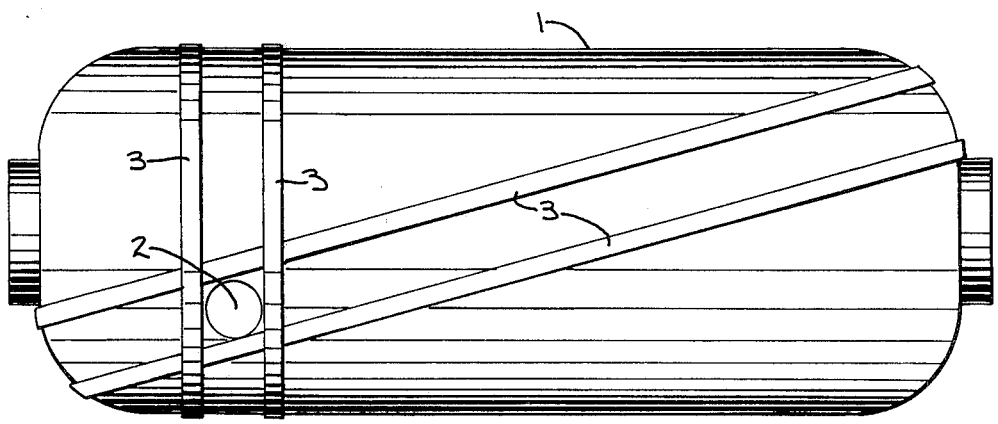
FIG. 3 is a side view of yet another embodiment of the present invention.

The present invention provides reinforcement for hole 2 which may be centrally located as in FIG. 1, off-center as in FIG. 2 or off-axis as in FIG. 3.

Reinforcement bands 3 consist of a series of filaments wound around the tank and bonded to and cured with wall 1. The reinforcing filaments may be of the same material as that used to form wall 1.

Reinforcement bands 3 may be wound around vessel wall 1 at approximately the same angles as those used during the formation of wall 1. For example, the tank shown in FIG. 1 would typically consist of two basic wrap angles i.e. ±25° and ±80° relative to the longitudinal axis of the vessel. Using these angles or approximately these angles for reinforcing bands 3 results in four low angle reinforcement bands 4a–4d wound at approximately ±25° and a pair of hoop reinforcement bands 5a–5b, approximating the ±80° wrap. This reinforcement wrapping technique results in a portion of each of the bands 4a–4c and 5a–5b running adjacent opening 2 so that substantially the entire perimeter of opening 2 is reinforced.

As seen in FIGS. 1 and 3, reinforcement bands 3 may be formed in pairs of parallel bands running on opposite sides of opening 2 or as seen in FIG. 2, when the location of opening 2 does not allow for a parallel pair of bands, reinforcement bands 3 may be wound at angles other than those used in winding wall 1 and bands 3 need not be symmetric about opening 2.

However, it should be noted that regardless of the style or pattern of the winding of bands 3, a portion of band 3 runs tangentially adjacent opening 2 and each of bands 3 overlap at least one other and in the vicinity of opening 2.

Various modes of carrying out the invention are contemplated as being within the scope of the following claims, particularly pointing out and distinctly claiming the subject matter which is regarded as the invention.

I claim:

1. A structural article comprising:
   a cylindrical wall having a longitudinal axis and formed of a cured thermosetting resin reinforced by fibrous material, said wall having an opening therein; and
   a plurality of pairs of opening reinforcement bands, said bands comprising a series of continuous filaments encircling said wall and bonded to the outer surface of said wall, with said bands in each of said pairs being disposed tangentially to the perimeter of said opening and on substantially opposite sides of said opening,
   one of said pairs of bands disposed substantially normal to the longitudinal axis of said cylindrical wall and
   at least one of said pairs of bands overlapping at least one other of said pairs of bands in the vicinity of said opening.

2. The structural article defined in claim 1 wherein said cylindrical wall is formed by a plurality of fibrous strands disposed in a helical pattern and wherein some of said filaments of said reinforcement bands are wound around said wall at approximately the same angles as those used in said helical pattern.

* * * * *